(12) United States Patent
Senne

(10) Patent No.: US 9,784,575 B2
(45) Date of Patent: Oct. 10, 2017

(54) OPTICAL DEVICE WITH A MEASUREMENT SCALE

(71) Applicant: GSO German Sports Optics GmbH & Co. KG, Biebertal (DE)

(72) Inventor: David Senne, Hannover (DE)

(73) Assignee: GSO GERMAN SPORTS OPTICS GMBH & CO. KG, Biebertal (DE)

( * ) Notice: Subject to any disclaimer, the term of this patent is extended or adjusted under 35 U.S.C. 154(b) by 57 days.

(21) Appl. No.: 14/640,463

(22) Filed: Mar. 6, 2015

(65) Prior Publication Data
US 2015/0253132 A1    Sep. 10, 2015

(30) Foreign Application Priority Data

Mar. 6, 2014  (DE) .......................... 10 2014 102 966

(51) Int. Cl.
| | |
|---|---|
| *G01C 3/04* | (2006.01) |
| *F41G 1/473* | (2006.01) |
| *G01C 3/02* | (2006.01) |
| *F41G 1/38* | (2006.01) |

(52) U.S. Cl.
CPC ................ *G01C 3/02* (2013.01); *F41G 1/38* (2013.01); *F41G 1/473* (2013.01); *G01C 3/04* (2013.01)

(58) Field of Classification Search
None
See application file for complete search history.

(56) References Cited

U.S. PATENT DOCUMENTS

| | | | |
|---|---|---|---|
| 1,190,121 A | | 4/1916 | Critchett |
| 3,190,003 A | * | 6/1965 | O'Brien .................... F41G 1/12 33/297 |
| 3,696,517 A | * | 10/1972 | Larson .................... F41G 1/467 33/265 |

(Continued)

FOREIGN PATENT DOCUMENTS

| | | |
|---|---|---|
| DE | 3145035 | 6/1982 |
| DE | 94 09 374 | 8/1994 |

OTHER PUBLICATIONS

Kullak; "Basiswissen Zielfernrohre"; Jan. 5, 2008, http://www.muzzle.de/N5/Zubehor/zielfernrohre.html.

(Continued)

*Primary Examiner* — Christopher Fulton
(74) *Attorney, Agent, or Firm* — Paul D. Bianco; Fleit Gibbons Gutman Bongini & Bianco PL

(57) ABSTRACT

An optical device with at least one measurement scale for the determination of the distance to an object with an at least approximately known size observed by the measurement scale. In order to make possible a quick, object size-independent readability of measurement values and a simpler calculation of the distance to an object from the read-off measurement values, the measurement scale includes a reference marking and at least one additional measurement marking with a numerical value that is correlated with it and that is inversely proportional to the distance of the reference marking from the pertinent measurement marking. The distance to the object observed by the measurement scale is produced by a multiplication of the size of the object with a measurement value read off from the measurement scale.

20 Claims, 5 Drawing Sheets

(56) References Cited

U.S. PATENT DOCUMENTS

| | | | | |
|---|---|---|---|---|
| 4,263,719 | A * | 4/1981 | Murdoch | F41G 1/12 33/277 |
| 4,403,421 | A * | 9/1983 | Shepherd | F41G 1/38 359/428 |
| 4,584,776 | A | 4/1986 | Shepherd | |
| 5,920,995 | A * | 7/1999 | Sammut | F41G 1/38 42/122 |
| 5,960,576 | A | 10/1999 | Robinson | |
| 6,357,158 | B1 * | 3/2002 | Smith, III | F41G 1/38 42/122 |
| 7,185,455 | B2 * | 3/2007 | Zaderey | F41G 1/38 42/122 |
| 7,877,886 | B1 * | 2/2011 | Hamilton | F41G 1/12 33/297 |
| 7,946,073 | B1 * | 5/2011 | Buck | G02B 23/10 42/130 |
| 7,958,643 | B1 * | 6/2011 | Wu | G02B 23/14 33/297 |
| 8,705,173 | B2 * | 4/2014 | Peters | G02B 23/10 359/428 |
| 8,910,412 | B2 * | 12/2014 | Mikroulis | F41G 1/473 42/122 |
| 9,068,799 | B1 * | 6/2015 | Wu | F41G 1/38 |
| 2006/0260171 | A1 | 11/2006 | Cole et al. | |
| 2013/0170027 | A1 | 7/2013 | Peters et al. | |

OTHER PUBLICATIONS

"Stadiametrische Entfernungmessung"; Wikipedia, Nov. 28, 2012 http://de.wikipedia.org/w/index.php?title=Stadiamentrische_Entfernungsmessung&oldid=111044189.

Result of Examination Report dated Nov. 10, 2014 for DE 10 2014 102 966.6.

Stadiametric rangefind; Wikipedia, printed Feb. 26, 2015.

English translation of A. Kullak; "Basiswissen Zielfernrohre" (Basic Knowledge Riflescopes); Jan. 5, 2008.

European Search Report (with machine translation) for EP 15 15 3726 dated Jul. 6, 2015.

* cited by examiner

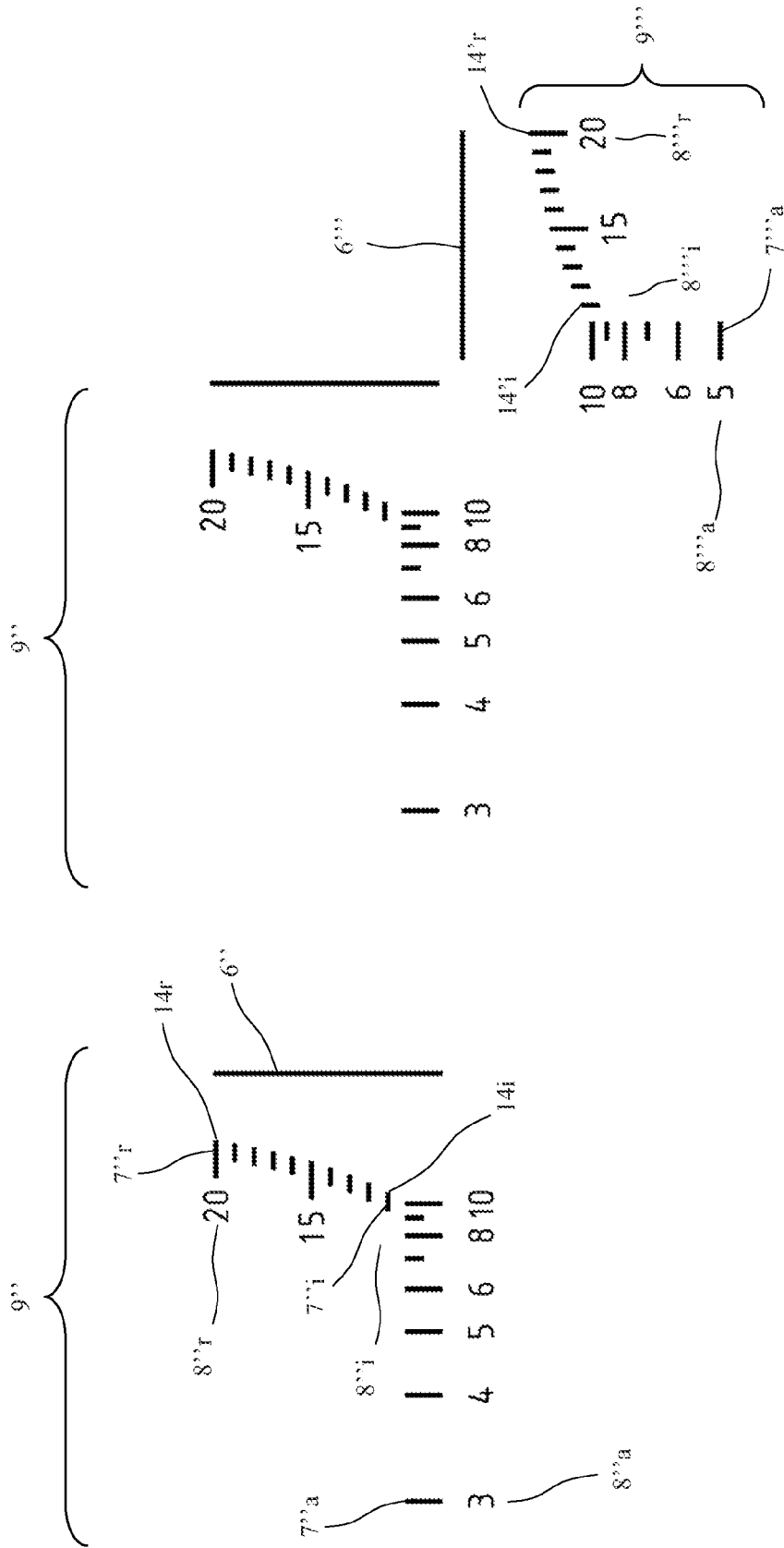

OPTICAL DEVICE WITH A MEASUREMENT SCALE

FIELD OF THE DISCLOSURE

The disclosure concerns an optical device with a measurement scale for the determination of a distance to an object observed through the measurement scale, and a method for the determination of the distance.

BACKGROUND OF THE DISCLOSURE

Viewed by an observer, such as a marksman, an object of a certain size B fills a certain angle β, independent of the distance E. The formula for this is sin β=B/E. With two known variables, the relationship between the object size, the distance, and the filled observation angle permits the determination of the third (unknown) variable. This relationship is utilized by the so-called stadiametric distance measurement. The angle measurement can be carried out, among other ways, with the aid of reticles in observation and target optics. For this purpose, markings are placed on the reticle, which permit the observer to read off the angle filled by the object. With a known object size, it is possible to calculate the distance with the aid of the angle read off. The attainable accuracy of the results thereby depends on how accurately the angle can be read off and how accurately the size of the pertinent object is known. For simplification, a mathematical linear approximation is thereby carried out.

Although nowadays efficient laser-distance gauges are mostly available, the distance measurement through a reticle continues to play an important role. It is used as an alternative method if the laser-distance gauge fails or when only a passive system can be used because of the risk of a detection of the laser. Therefore, estimating the distance through a reticle is taught, as before, in the training of snipers and also in corresponding sport competitions, the determination of the target distance merely with the aid of the so-called anticipation is promoted. Current target optics, therefore, often continue to contain special markings for the stadiametric distance measurement, without there having been any substantial further development in comparison to methods known for decades.

From the state of the art, target optics are known that utilize the various systems for the distance measurement. The system that is most widespread today is the so-called "mil dot" range finding of a target optics that is provided with points that indicate an angle of one milliradian (mrad). A mrad is defined as the arc length that is 1/1000 of the radian length. A mrad corresponds thereby to 10 cm per 100 m or 1 m per 1000 m, and so forth. This would correspond to an approximate conversion of the approximation (for small angles) into the metric system. Increasingly widespread are reticles that do not use points (used earlier in wire range finding for reasons having to do with manufacturing feasibility), but rather scale lines that also permit finer divisions.

The mrad scale is universally applicable and not linked to a specific object size. It can be used both for distance determination as well as a hitting accuracy correction.

The linearly approximated formulation for the distance determination is as follows:

Object size $B$ [m]×1000/Measurement value [mrad]
=Distance $E$ [m]

Advantages of the mrad scale are the universal applicability and the possible fine division, which makes a high accuracy possible. A scale with a division of 0.1 mrad is practical with a corresponding enlargement of the optics.

The scale division can also take place in any other angular scale. In the English-speaking realm, minutes of angle (MOA) continue to be widespread; the SI unit (milli)radian, however, is more advantageous in connection with the decimal system, since the ratio 1/1000 brings about a decimal point displacement without an additional factor in calculations.

Such a system can be seen with regard to the "mil dot" range finding, for example, in U.S. Pat. No. 7,185,455 B2. This shows crosshairs with a primary horizontal line of sight and a vertical line of sight that intersect in a target point. Other target marks, in the form of lines, are located on the lines of sight; they form a scale and cut the lines of sight vertically. The distances of the individual target marks on the lines of sight subdivide the scale thereby into specific mrad measurements, for example, of 2.5 mrad (mils). The length of the pertinent target marking also has an mrad division, for example, of 0.1, 0.3, or 0.5. The formula mentioned above is to be used for the calculation of the distance to a target.

The disadvantage hereby is the division with perhaps uneven values needed during the calculation, which mostly cannot be carried out in one's head. For the calculation of the distance, the user is therefore compelled to use a pocket calculator, tabulated values, or a slide rule specially made for this purpose (U.S. Pat. No. 5,960,576). All of these calculation methods lead to the marksman losing sight of the target image during the calculation. Moreover, they require aids which may perhaps not function or may get lost.

The second possibility of the distance determination with the aid of the reticle is a scale adapted to a specific object size. Markings are thereby placed on the reticle, between which a target object of a specific size is adjusted. The marking suitable for the object size is labelled with the corresponding distance. If a suitable target object is present, then the distance can be read off directly and without further calculation.

Target optics known from the military area frequently use markings that correspond to the size of a standing man target (1.5-1.8 m); otherwise, the standard measure of 1 m height is common. Markings that correspond to the shoulder width of a man target (0.45 m or 0.5 m), or alternatively combinations of 1 m height and 0.5 m width, are also widely used. However, the most varied reticles also exist, which are adapted to the size of certain animals or, for example, to vehicle silhouettes (for example, with optics for anti-tank hand guns), which are provided with distance marks. The target optics of battle tanks also often have corresponding reticles as a substitute for a laser-distance gauge that has perhaps failed.

It is problematical hereby that the markings are designed for a specific size of the target object. If an object of the suitable size is not visible, for example, because the target is partially covered, then the markings cannot be used. Furthermore, intermediate values must be estimated with intermediate distances, which is frequently complicated by the separate arrangements of the markings for different distances.

SUMMARY OF THE DISCLOSURE

Aspects of the disclosure relate to an optical device and a method that make possible a rapid, object size-independent readability of measurement values and a simpler calculation of the distance to an object from the read-off measurement values.

Preferred embodiments of the optical device are also disclosed.

The optical device in accordance with the disclosure has at least one measurement scale for the determination of the distance E to an object with an at least approximately known size B, observed through the measurement scale, wherein the measurement scale comprises a reference marking and at least one additional measurement marking with a numerical value that is correlated with it and that is inversely proportional to the distance of the reference marking from the pertinent measurement marking, and wherein the distance E to the object observed through the measurement scale is produced by a multiplication of the size B of the object with a measurement value read off from the measurement scale.

On the basis of the numbers of the measurement scale, the division otherwise needed when using an mrad scale and the appropriate formula is not necessary, since only a very much simpler multiplication that can be carried out in one's head is to be undertaken for the calculation of the distance.

For example, the following formula for the distance determination results:

Object size $B$ [m]×100×measurement value=Distance $E$ [m]

In a particularly advantageous embodiment, the optical device comprises several measurement markings with correlated integral numerical values, wherein each numerical value is produced from a multiplication of the reciprocal distance of the correlated measurement marking from the reference marking with a prespecified proportionality factor P, wherein P corresponds to $P=10^n$ and n is a natural number, in particular 1, 2, or 3.

As a result of the use of a proportionality factor, integral numerical values are produced, thereby preventing the scale from containing decimal places. In this way, the manageability during the complication in one's head is improved. With n=1, there is the advantage that the size of the object during the calculation can be assumed in centimeters instead of millimeters.

The aforementioned formula can be shown simplified for the purpose:

Object size $B$ [cm]×measurement value=Distance $E$ [m]

In an appropriate embodiment, optically visible numerical values are correlated with the pertinent measurement markings of the optical device.

According to one appropriate embodiment, the measurement markings of the measurement scale are arranged in a series. In this way, numerical values can be better estimated, since the measurement scale can be designed as a "tape measure" placed on the object and the observer does not have to change between different distance marks, as is usual with object-specific measurement scales.

In another advantageous embodiment, several measurement scales are provided, which, for example, can be arranged essentially perpendicular to one another. In this way, different sizes of the objects, such as shoulder width or height, can be used for the calculation of the distance. The measurement scales can be thereby arranged, for example, in the different areas of the reticle.

According to one appropriate embodiment, the several measurement scales have different divisions. In this way, for example, either a known mrad scale or a known object-specific measurement scale can be used with the measurement scale in accordance with the disclosure in a reticle.

In an appropriate development, the several measurement scales can be arranged, for example, perpendicular to one another.

For the determination of the distance to an object with an at least approximately known size by means of an optical device with a measurement scale in accordance with the disclosure, two reference points of the object are first observed through the measurement scale in the method in accordance with the disclosure. Then, the reference marking is applied to the first reference point of the object. Subsequently, a measurement value is detected on the measurement scale that coincides with the second reference point, wherein, then, the detected measurement value is read off on the measurement scale. Finally, for the determination of the distance E to the object, the at least approximately known size B of the object is multiplied with the detected measurement value.

On the basis of the inversely proportional arrangement of the markings, the division that is otherwise needed when using an mrad scale and the appropriate formula is not necessary, since only a very much simpler multiplication that can be carried out in one's head has to be undertaken for the calculation of the distance.

BRIEF DESCRIPTION OF THE DRAWINGS

These and other advantages of the optical device in accordance with the disclosure with a measurement scale for the determination of a distance and a method for the purpose can be deduced from the embodiment example described in more detail below, with reference to the accompanying drawings. The figures show the following:

FIG. 4 a representation of a first embodiment of an alternative measurement scale of a reticle with an expanded measurement scale (FIG. 4a) and a representation of a second embodiment of an alternative measurement scale of a reticle with an expanded measurement scale (FIG. 4b).

DETAILED DESCRIPTION OF THE DISCLOSURE

Figure 1B:
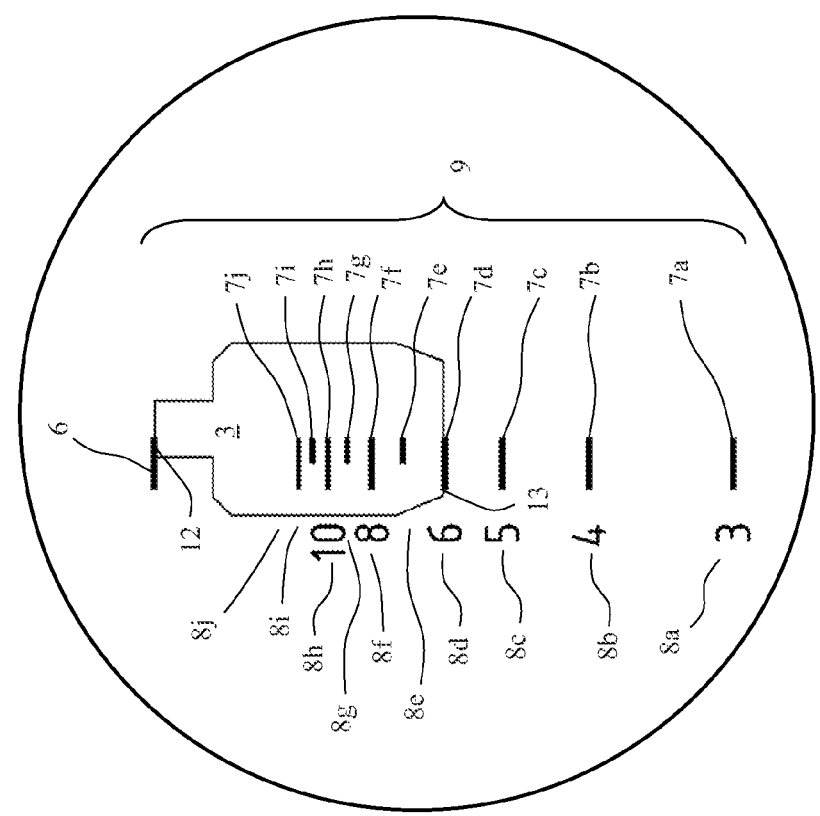
FIG. 1 a schematic representation of an optical device with a measurement scale for the distance measurement (FIG. 1a), a first embodiment of the enlarged representation of the section (FIG. 1b) shown in the circle in FIG. 1a, a second embodiment of the enlarged representation of the section (FIG. 1c) shown in the circle in FIG. 1a, and a schematic representation of the reticle in an optical device (FIG. 1d)
Figure 1A:
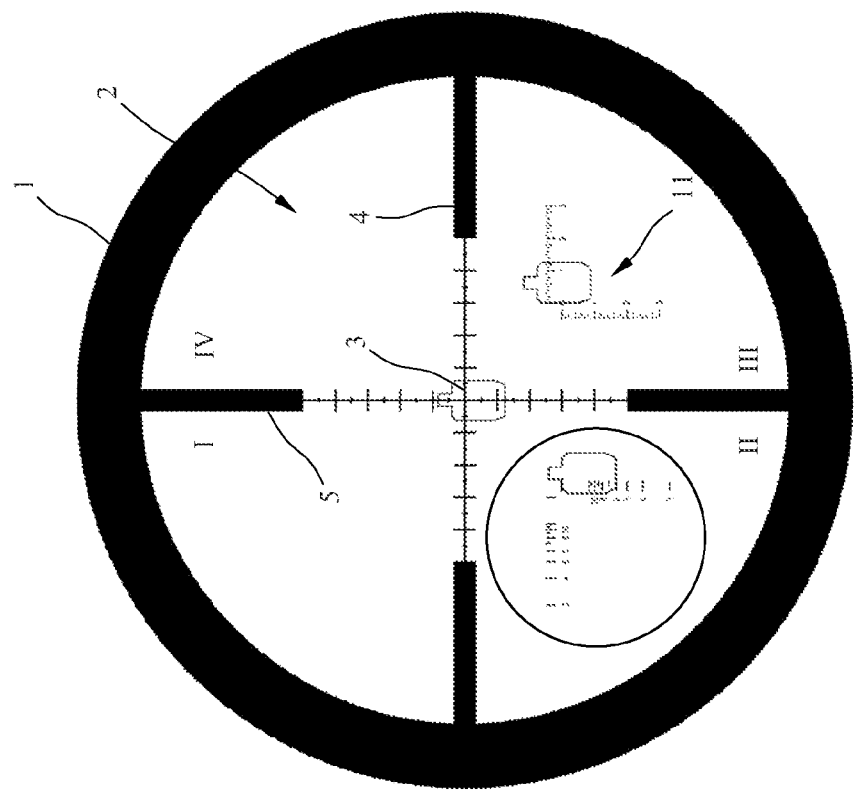
Figure 1C:
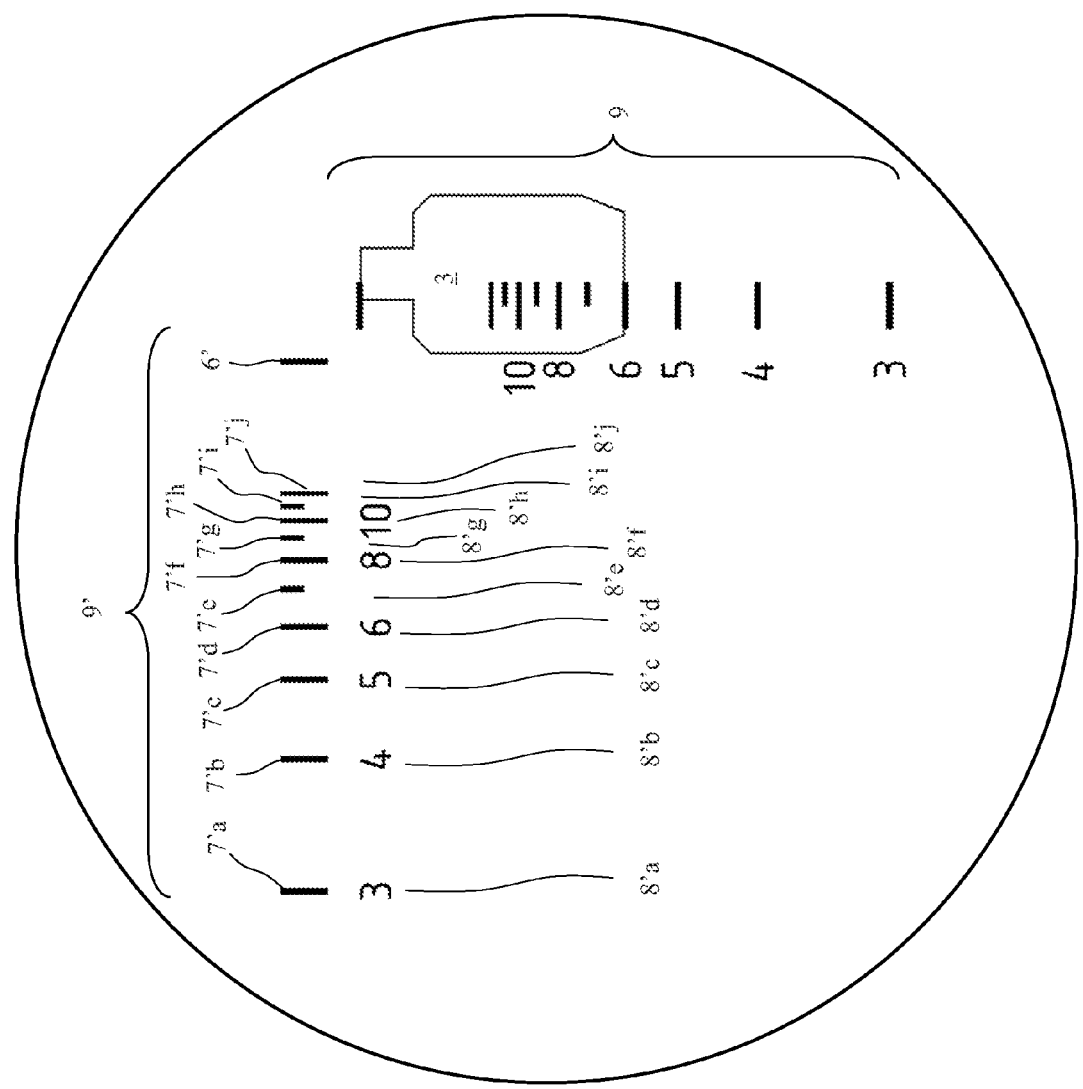
Figure 1D:
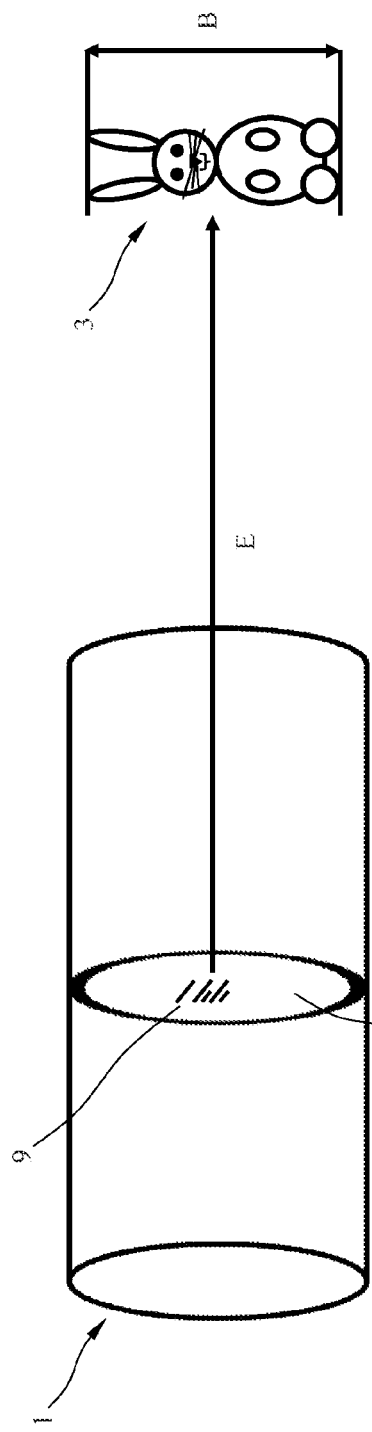

FIG. 1a schematically shows an optical device 1 with a measurement scale 9, located on a reticle 2 and depicted in more detail in FIGS. 1b-d, for the determination of a distance E to an object 3 observed through a reticle plate 2.

The transparent reticle 2, shown in FIG. 1, is located in an optical device 1, which, for example, is an observation or target optics, such as binoculars, a telescope, or a telescopic sight. Through the reticle 2 of the optical device 1, an object 3, shown in particular in FIG. 1d, with an at least approximately known size B, is observed at a distance E. It is thereby assumed that the size of the object 3 can be at least approximately estimated or is known. Furthermore, the reticle 2 has crosshairs 4, 5, wherein the crosshairs 4, 5 of the reticle 2 are designed in the form of two threads 4 and 5, which intersect in the center of the reticle 2 and divide the reticle 2 into four quadrants (I to IV). Likewise, the division of a reticle 2 with observation or target optics is not restricted to the division into four quadrants. The crosshairs 4, 5 continue to have a scale for the distance measurement, which is not described in more detail here, and also for the selection or correction of the target point. It can hereby be, for example, the "mil dot" range finding mentioned in the beginning.

As can also be seen in FIG. 1*a*, a first marking 6, shown in FIG. 1*b*, in the form of a reference marking 6, and other markings, in the form of measurement markings 7*a*-7*j*, are located in quadrant II of the reticle 2, wherein an integral numerical value 8*a*-8*j* is correlated with each measurement marking 7*a*-7*j*. It should be noted hereby that for reasons of a lack of space and clarity, an integral measurement value 8*a*-8*j* need not be correlated optically with every measurement marking 7*a*-7*j*. Thus, in the embodiment example for the measurement markings 7*e, g, i,* and *j*, no integral values 8*e, g, i,* or *j* are rendered optically.

The measurement markings 7*a*-7*j* are arranged in a series and define a measurement scale 9 with the reference marking 6.

The structure and the function of the measurement scale 9 are explained below, with the aid of FIG. 1*b*.

The integral numerical value 8*a*-8*j* of the measurement scale 9 correlated with the individual measurement markings 7*a*-7*j* is inversely proportional to the distance of the reference marking 6 from the pertinent measurement marking 7*a*-7*j*.

Figure 2:
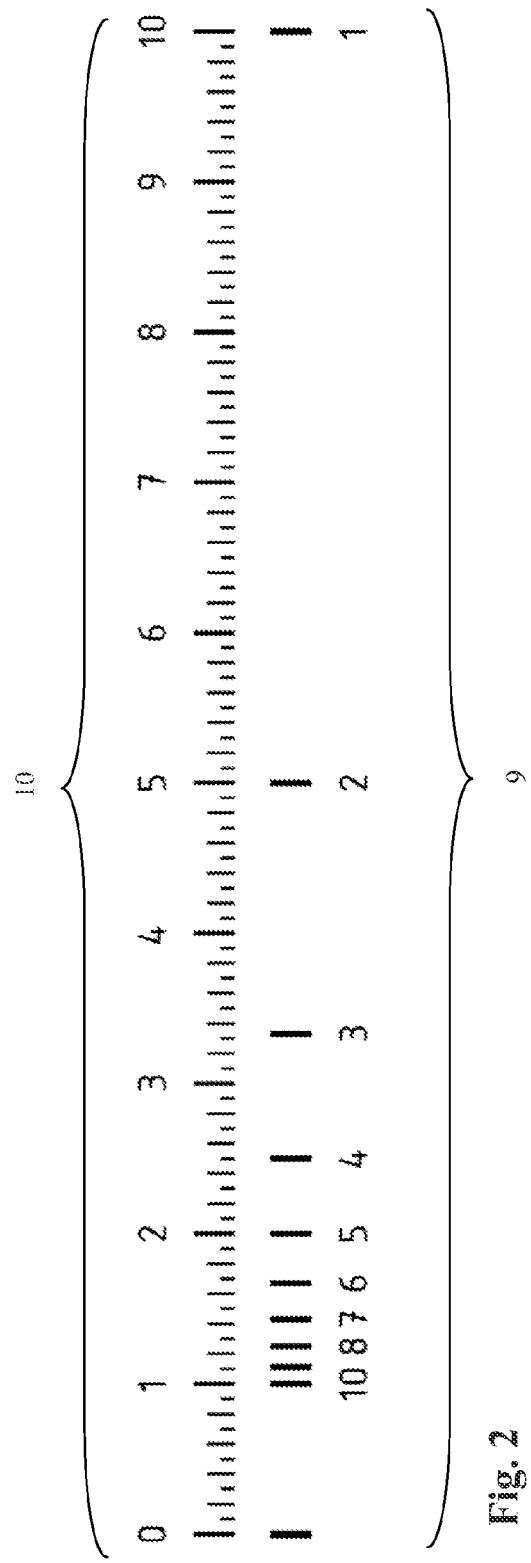
FIG. 2 a representation of the structure of a measurement scale in accordance with the disclosure.

This is clarified, in particular, in FIG. 2, which contrasts the measurement scale 9 for viewing with an mrad scale 10 with a division of 0.1 mrad. The measurement scale 9 formed by the measurement markings 7*a*-7*j* represents the integral numerical values 8*a*-8*j* of a 1/x function or (Px1)/X, wherein X designates the corresponding values in mrad.

By the representation of the reciprocal values of the mrad scale 10, the division needed when using an mrad scale 10 and the appropriate formula are already integrated into the measurement scale 9 and are replaced during the calculation by a very much simpler multiplication that can be carried out in one's head. A proportionality factor P is only used for better manageability. Thus the measurement scale 9 is prevented from containing decimal places. To this end, each numerical value of the function mentioned above is multiplied with a prespecified proportionality factor P, wherein the proportionality factor corresponds to P=10n, wherein n is a natural number, for example, n=1, 2, 3, and so forth.

With n=1, there is the advantage that the size of the object 3 can be assumed in centimeters instead of millimeters in the calculation.

The formula for the distance determination is thus the following for n=1:

Target size *B* [m]×100×scale value (measurement value)=Distance [m]

or simplified:

Target size *B* [cm]×scale value (measurement value)=Distance [m]

A second embodiment example in accordance with the disclosure is shown in FIG. 1*c*. In addition to the measurement scale 9, another measurement scale 9' is provided, wherein the measurement scales 9 and 9' are arranged essentially perpendicular to one another, which makes possible a detection or utilization of measurement values of the measurement scales 9 and 9' as a function of the available, at least approximately known size of the object 3. As known from FIG. 1*b*, the measurement scale 9' is likewise composed of a reference marking 6' and measurement markings 7'*a*-7'*j*, wherein an integral numerical value 8'*a*-8'*j* is correlated with each measurement marking 7'*a*-7'*j*. It should be noted hereby that, for reasons having to do with a lack of space and clarity, an integral measurement value 8'*a*-8'*j* need not be correlated with each measurement marking 7'*a*-7'*j*. Thus, in the embodiment example, no integral numerical values 8'*e, g, i,* or *j* are optically rendered for the measurement markings 7'*e, g, i,* and *j*. It is also conceivable to provide only one of the two measurement scales 9 or 9', instead of two measurement scales 9, 9' arranged essentially perpendicular to one another.

The measurement scales 9, 9' can be placed arbitrarily in one of the four quadrants I to IV formed by the crosshairs 4, 5.

In another embodiment, another scale 11 can be provided, as can be seen from FIG. 1*a*, in quadrant III of the reticle 2; this scale is an mrad scale. The use of additional scales, for example, an object-specific scale, is also conceivable. Furthermore, it is, for example, possible to place the scales 9, 9', and 11 in one quadrant or in any arbitrary quadrant.

As a result of the sizes of the objects 3 to be expected with the use in an optical device, it is sufficient if the measurement scale 9, 9' begins with the value 2 or 3. The range of the numerical values 8*a*-8*j* is limited upward by the measurement markings 7*a*-7*j* moving too close to one another and the enlargement-caused resolution; here, practical values are 10-14, depending on the enlargement. For measurement scale 9, 9' with a maximum value above 14, for example, for use in high magnification spotting scopes, an alternative arrangement of the measurement markings 7*a*-7*j* is possible; this is shown in FIG. 4. In the embodiment example in accordance with FIGS. 1-3, the measurement scales 9, 9' are shown with a value range of 3-12. One should note hereby that for reasons having to do with lack of space and clarity, an integral measurement value 8*a*-8*j* need not be optically correlated with each measurement marking 7*a*-7*j*.

Below, with the aid of FIG. 1*b* and FIGS. 3*a* and 3*b*, the method for the determination of the distance E to an object 3 with an at least approximately known size B is described by means of the previously described reticle 2 of an optical device 1, using various applications. Thus, in FIG. 1*b*, the size B, namely, the total height (75 cm); in FIG. 3*a*, the shoulder height (60 cm); and in FIG. 3*b*, the shoulder width (45 cm) of the object 3 are at least approximately known.

For the determination of the distance E to an object 3 with an at least approximately known size B, two reference points 12, 13 of the object 3 are first observed through the reticle 2 of the optical device 1, and the reference marking 6 is applied on the first reference point 12 of the object 3. Subsequently, a measurement value is detected on the measurement scale 9 or 9' that coincides with the second reference point 13 of the object 3. The measurement value can be an estimated value that, for example, lies between the integral measurement markings 7*a*-7*j*, if the reference point 13 coincides with this estimated value.

Figure 3B:
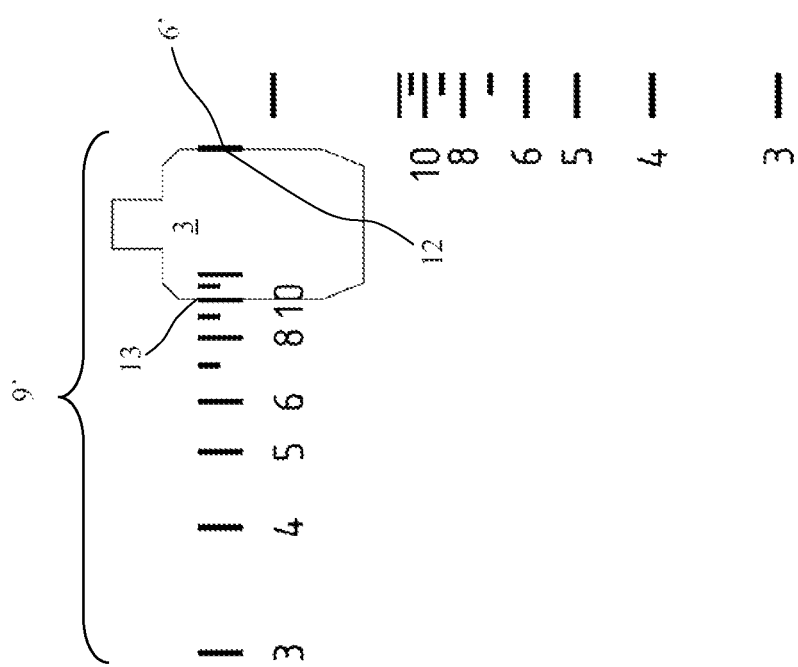
FIG. 3 a schematic representation of a measurement scale on the reticle in accordance with the disclosure with the detection of the measurement values for a known height of an object (FIG. 3a) and width of an object (FIG. 3b)
Figure 3A:
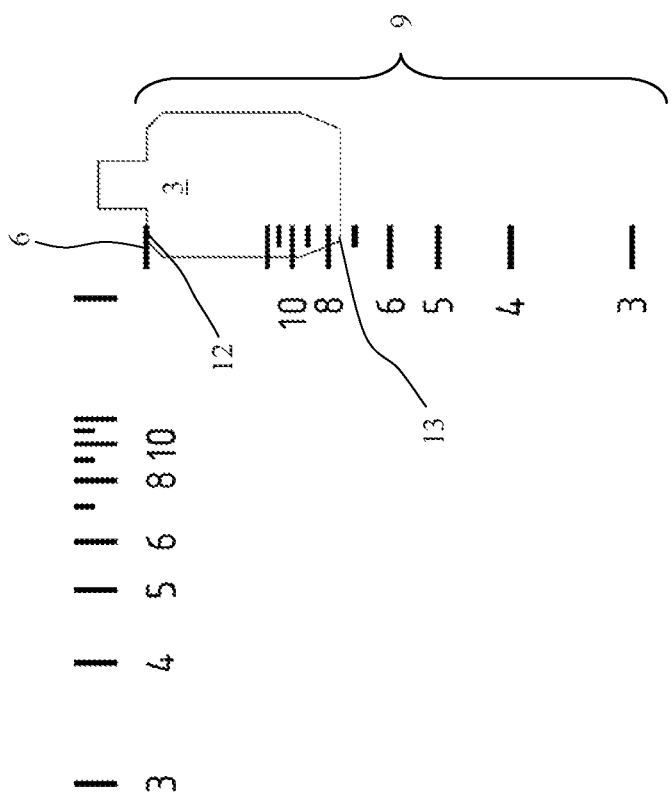

Since the total height and the shoulder height are known as size B of the object 3 in FIGS. 1*b* and 3*a*, the measurement scale 9 is used. The measurement value 6 is hereby produced in FIG. 1*b* and the measurement value 7.5, in FIG. 3*a*, which can be read off from measurement scale 9. With a known width of an object 3, the measurement scale 9' is used, as can be seen in FIG. 3c. The measurement value 10, which can be read off from the measurement scale 9', is hereby produced.

In order to determine the distance E to the object 3, then, in accordance with the previously mentioned formula:

Target size B [cm]×scale value (measurement value)=Distance E [m], a multiplication of the at least approximately known size B of the object 3 with the detected measurement value is carried out. In accordance with the sizes B known in FIGS. 1b, 3a, and 3b, the following calculations are produced:

Known total height (75 cm, FIG. 1b): 75×6=450 [m]

Known shoulder height (60 cm, FIG. 3a): 60×7.5=450 [m]

Known shoulder width (45 cm, FIG. 3b): 45×10=450 [m]

Each of the known sizes B (height or width) of the object 3 shown in FIGS. 1a, 3a, and 3b could be covered and therefore not be accessible for the distance determination. By the universal use of the measurement scales 9, 9' and the availability both of a vertical and also a horizontal measurement scale 9, 9', recourse can be had to another visible measurement and nevertheless, the distance E can be determined quickly and without losing sight of the object 3, since one need not have recourse to the mrad scale.

The measurement scales 9, 9' can be used simply and intuitively after an easily understandable explanation. The disclosure simplifies the calculation of the distance in that a division is replaced by a multiplication. Since it can be simply combined with an mrad scale 11, the advantages of the system in accordance with the disclosure can be optionally used with the known systems in a rangefinder or crosshairs. With the preferably symmetrical arrangement, moreover, a balance and characteristic appearance is produced. Likewise, any different arrangement of the scales 9, 9', and 11 is conceivable.

FIG. 4a depicts a first embodiment of an expanded measurement scale 9" with measurement markings 7"a-7"r and their correlated integral numerical values 8"a-8"r. The measurement scale 9" now comprises a maximum value of 20 for the integral numerical values 8"a-8"r. This arrangement of the measurement scale 9" is, for example, possible for use in high magnification spotting scopes.

As a result of the measurement markings 7"a-7"r that move too near to one another, another arrangement is necessary for the measurement markings 7"i-7"r, which can be seen in FIG. 4a. Thus, the measurement markings 7"a-7"r do not form a continuous horizontal series, since some of the measurement markings 6"i-6"r are perpendicular to the measurement markings 7"a-7"h and run vertically upward.

A determination of the distance E to the object 3, however, also takes place according to the aforementioned method. However, one must note hereby that in the detection of the measurement value of the measurement scale 9" that coincides with the second reference point 13 of the object 3, only one point 14i-14r of the measurement markings 7"i-7"r need to coincide with the second reference point 13 of the object 3. For reasons having to do with clarity, not all points 14i-14r, all measurement markings 7"a-7"r, and corresponding integral numerical values 8"a-8"r are provided with reference symbols in FIGS. 4a and 4b.

In FIG. 4b, a second embodiment of an expanded measurement scale 9'" is shown, which is composed of the reference marking 6'" and several measurement markings 7'"a-7'"p with points 14'g-14'p and their correlated integral numerical values 8'"a-8'"p. The measurement scales 9" and 9'" are arranged essentially perpendicular to one another, which makes possible a detection or utilization of measurement values of the measurement scales 9" and 9'" as a function of the available, at least approximately known size B of the object 3. It is also conceivable that only one of the two measurement scales 9" or 9'" be provided instead of two measurement scales 9", 9'" arranged essentially perpendicular to one another.

The invention claimed is:

1. An optical device for determination of a distance to an object viewed through the optical device, the object having an at least approximately known size, said optical device comprising:
a visible measurement scale including a reference marking and a plurality of measurement markings each representing a numerical value that is:
correlated with the measurement scale,
inversely proportional to a distance between the reference marking and a respective measurement marking, and
pre-calculated to incorporate a scaling factor such that no further calculation is needed to determine a distance to the object other than multiplying the size of the object by the numeric value represented by one of the measurement markings selected by placing the reference marking on one reference point of the object viewed through the optical device and determining that the one of the measurement markings coincides with another reference point of the object,
wherein the measurement markings are not uniformly spaced, and
at least some of the numerical values are optically rendered in the measurement scale.

2. The device according to claim 1, wherein each numerical value is produced from a multiplication of the reciprocal distance of the correlated measurement marking from the reference marking with a prespecified proportionality factor.

3. The device according to claim 2, wherein the proportionality factor corresponds to $P=10^n$, wherein n comprises a natural number.

4. The device according to claim 1, wherein all of the numerical values are optically rendered along with their corresponding measurement markings.

5. The device according to claim 1, wherein the measurement markings are arranged in a series.

6. The device according to claim 1, wherein the optical device has a plurality of differently arranged visible measurement scales according to claim 1.

7. The device according to claim 6, wherein the measurement scales have different divisions.

8. The device according to claim 6, wherein the measurement scales are arranged substantially perpendicular to one another.

9. The device according to claim 1, wherein the measurement scale is located on a reticle.

10. The device of claim 1, wherein the scaling factor is a division step using the basis of the measurement scale.

11. The device according to claim 1,
wherein the measurement markings represent one series of integral values, and
the measurement markings do not form one continuous horizontal or vertical series.

12. The device according to claim 1,
wherein the measurement markings represent one series of integral values, and
the measurement markings are arranged into a first series and a second series that is substantially perpendicular to the first series.

13. The device according to claim 1,
wherein some of the measurement markings are arranged in a substantially horizontal series,
a remainder of the measurement markings are arranged in a substantially vertical series, and
a series of numerical values represented by the measurement markings of one of the horizontal and vertical series is a continuation of a series of numerical values represented by the measurement markings of by the other of the horizontal and vertical series.

14. The device according to claim 1, wherein some of the numerical values are not optically rendered along with their corresponding measurement markings.

15. The device according to claim 1, wherein each of the numerical values is a whole integer.

16. The device according to claim 1, wherein each of the numerical values that is optically rendered in the measurement scale is a whole integer.

17. A method for determination of a distance to an object with having an at least approximately known size, said method comprising:
observing two reference points of the object through an optical device that includes a visible measurement scale including a reference marking and a plurality of measurement markings each representing a numerical value that is:
correlated with the measurement scale,
inversely proportional to a distance between the reference marking and a respective measurement marking, and
pre-calculated to incorporate a scaling factor such that no further calculation is needed to determine a distance to the object other than multiplying the at least approximately known size of the object by the numeric value represented by one of the measurement markings,
wherein the measurement markings are not uniformly spaced, and at least some of the numerical values are optically rendered in the measurement scale;
placing the reference marking on the first reference point of the object;
determining the measurement marking that coincides with the second reference point of the object; and
calculating the distance to the object by multiplying the at least approximately known size of the object with the numerical value represented by the measurement marking that coincides with the second reference point of the object without a requirement of performing a division.

18. The method of claim 17, wherein the scaling factor is a division step using the basis of the measurement scale.

19. The method of claim 17, wherein the scaling factor is a division step associated with the one of the plurality of measurement markings.

20. The method of claim 17, wherein all of the numerical values represented by the measurement markings are whole integers.

* * * * *